(12) United States Patent
Ishii (10) Patent No.: US 6,466,523 B1
(45) Date of Patent: Oct. 15, 2002

(54) DISPLACEMENT OF MAGNETIC HEAD AND OPTICAL HEAD IN MAGNETO-OPTICAL RECORDING APPARATUS

(75) Inventor: Kazuyoshi Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 09/649,233

(22) Filed: Aug. 29, 2000

(30) Foreign Application Priority Data

Aug. 31, 1999 (JP) ............................................. 11-245486

(51) Int. Cl.$^7$ .............................................. G11B 11/00
(52) U.S. Cl. ................................................. 369/13.12
(58) Field of Search ........................... 369/13.12, 13.13, 369/13.17, 13.2, 13.21; 428/694 ML (56) References Cited

U.S. PATENT DOCUMENTS

| | | | |
|---|---|---|---|
| 5,303,100 A | * 4/1994 | Nakayama et al. | 360/104 |
| 5,377,055 A | 12/1994 | Ishii | 360/59 |
| 5,485,433 A | 1/1996 | Satomura et al. | 369/13 |
| 5,523,986 A | 6/1996 | Ishii | 369/13 |
| 5,550,796 A | 8/1996 | Ishii | 369/13 |
| 5,559,763 A | 9/1996 | Ishii | 369/13 |
| 5,563,853 A | 10/1996 | Ishii | 369/13 |
| 5,579,293 A | 11/1996 | Ishii | 369/13 |
| 5,586,091 A | 12/1996 | Ishii | 369/13 |
| 5,615,183 A | 3/1997 | Ishii | 369/13 |
| 5,661,612 A | 8/1997 | Hasegawa et al. | 360/59 |
| 5,687,141 A | 11/1997 | Ishii | 369/13 |
| 5,689,478 A | 11/1997 | Ishii et al. | 369/13 |
| 5,703,839 A | 12/1997 | Ishii | 369/13 |
| 5,986,976 A | 11/1999 | Ishii | 369/13 |
| 5,991,242 A | 11/1999 | Ishii | 369/13 |
| 6,041,024 A | 3/2000 | Ishii | 369/13 |
| 6,091,673 A | * 7/2000 | Murakami et al. | 369/13 |
| 6,185,162 B1 | * 2/2001 | Kunimatsu et al. | 369/13 |

* cited by examiner

*Primary Examiner*—Tan Dinh
(74) *Attorney, Agent, or Firm*—Fitzpatrick, Cella, Harper & Scinto (57) ABSTRACT

A magneto-optical recording head includes a magnetic head for applying a magnetic field to a magneto-optical recording medium, and an optical head placed with interposition of the recording medium in opposition to the magnetic head for projecting a light spot through a condenser lens onto the region to which the magnetic field is applied. A first supporter supports the magnetic head, and a second supporter supports the condenser lens. Relative displacement of a magnetic field-generating portion of the magnetic head and the light spot in a horizontal direction parallel to a surface of the recording medium caused by displacements of the magnetic field-generating portion and the light spot in a direction perpendicular to a surface of the recording medium is smaller than the displacement of the magnetic field-generating portion of the magnetic head in the horizontal direction parallel to the surface of the recording medium.

12 Claims, 3 Drawing Sheets

DISPLACEMENT OF MAGNETIC HEAD AND OPTICAL HEAD IN MAGNETO-OPTICAL RECORDING APPARATUS

BACKGROUND OF THE INVENTION

1. Field of the Invention

The present invention relates to a magneto-optical recording head comprising a magnetic head and an optical head placed in opposition; the magnetic head having a magnetic field-generating portion for applying a magnetic field locally to a magneto-optical recording medium, and the optical head having a condenser lens for focusing a light beam on a magnetic recording layer to form a light spot in a region where the magnetic field is applied. The present invention relates also to a magneto-optical recording apparatus employing the magneto-optical recording head for recording information signals.

2. Related Background Art

Figure 4:
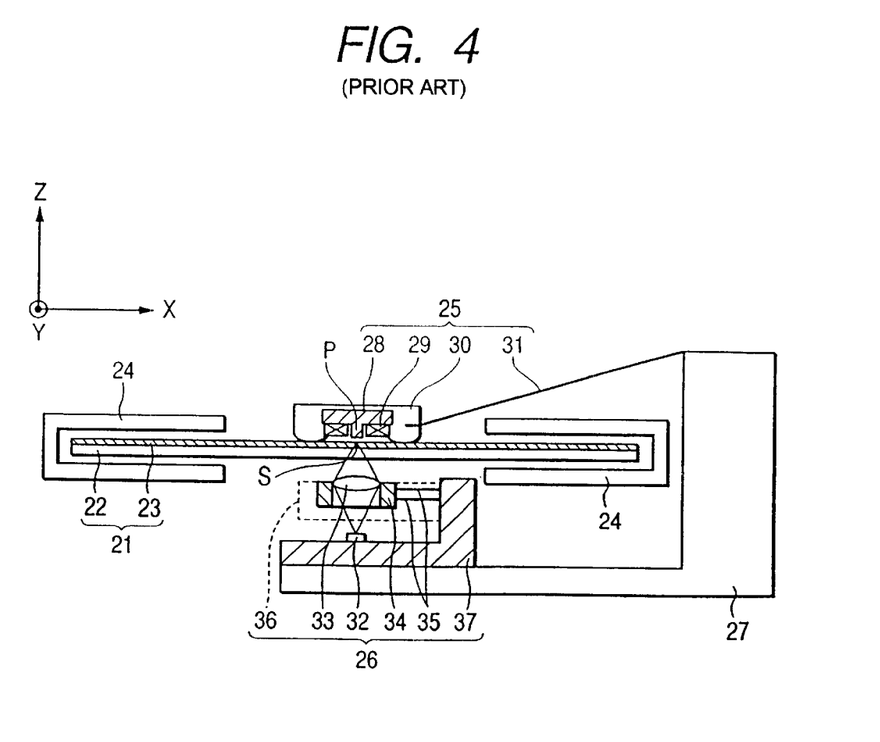
FIG. 4 shows constitution of a conventional magneto-optical recording apparatus.

Magneto-optical recording apparatus are known which record information signals by applying a magnetic field modulated by the information signals onto a magneto-optical recording medium and projecting thereto a light beam for recording. FIG. 4 is a schematic side view of constitution of an example of the conventional magneto-optical recording apparatus. In FIG. 4, magneto-optical recording medium 21 is constituted of substrate 22 made of a transparent material like glass or a resin, and a magnetic recording layer 23 formed thereon, and is housed in cartridge 24. Magnetic recording layer 23 has a spiral-shaped recording track for recordation of information signals. Magneto-optical recording medium 21 is connected to a spindle motor (not shown in the drawing). Cartridge 24 has apertures. Magnetic head 25 is placed at the aperture on the upper face side (on the side of magnetic recording layer 23) of magneto-optical recording medium 21 and optical head 26 at the other aperture on the lower side thereof in opposition and with interposition of magneto-optical recording medium 21.

Magnetic head 25 comprises core 28 which is composed of a magnetic material like ferrite and has protruding columnar magnetic pole P, coil 291 surrounding the magnetic pole P, slider 30 composed of a material like a lubricative resin or ceramic, and first supporter 31 in a flat plate shape composed of an elastic material like phosphor bronze or a beryllium copper. Core 28 together with coil 29 are mounted on slider 30 such that the end face of magnetic pole P for magnetic field generation opposes magneto-optical recording medium 21. Slider 30 is fixed at the tip end of first supporter 31 and is pressed to the surface of magneto-optical recording medium 21 by the elasticity of first supporter 31.

Optical head 26 comprises laser light source 32 like a semiconductor laser, condenser lens 33, lens holder 34 for holding the condenser lens 33, second supporter 35 constituted of an elastic material like phosphor bronze or beryllium copper in a straight line shape, actuator 36 placed around lens holder 34, and basement 37 for holding these constituting members. Lens holder 34 is fixed to the tip end of second supporter 35. The base end of second supporter 35 is fixed to basement 37 which is fixed to connecting member 27. Actuator 36 is constituted of a coil and a permanent magnet which are not shown in the drawing, and drives lens holder 34 electromagnetically.

On recording the information signals, slider 30 of magnetic head 25 is pressed against the surface of magneto-optical recording medium 21, and on loading or unloading of cartridge 24, slider 30 is withdrawn upward so as not to collide with cartridge 24. Therefore, the base end of first supporter 31 is fixed to connecting member 27 at a position higher than the upper face of cartridge 24. Thus, when slider 30 is pressed against the surface of magneto-optical recording medium 21, first supporter 31 is tilted at a certain angle relative to magneto-optical recording medium 21.

Coil 29 of magnetic head 25 is connected to a magnetic head driving circuit (not shown in the drawing), and laser light source 32 of optical head 26 is connected to a laser driving circuit (not shown in the drawing), respectively.

In recordation of information signals on magneto-optical recording medium 21, firstly, magneto-optical recording medium 21 is rotated by the spindle motor. In the rotation, slider 30 of magnetic head 25 is allowed to slide on or above magneto-optical recording medium 21. Since slider 30 is pressed against the surface of magneto-optical recording medium 21, magnetic pole P of core 28 set on slider 30 can follow the displacement in the Z direction (direction perpendicular to the surface of magneto-optical recording medium 21) of the surface of the magneto-optical recording medium 21 caused by irregularity or variation in the thickness, or swing of the face of magneto-optical recording medium 21. Thereby, the interspace is kept constant between the end face of magnetic pole P of core 28 and magnetic recording layer 23 of magneto-optical recording medium 21. An electric current is applied from the magnetic head driving circuit to coil 29 of magnetic head 25 to generate a magnetic field modulated by information signals to be recorded at the end face of magnetic pole P of magnetic head 25. This magnetic field is applied virtually perpendicularly to magnetic recording layer 23 of magneto-optical recording medium 21 opposing the end face of magnetic pole P. Simultaneously, electric current is applied from the laser driving circuit to laser light source 32 of optical head 26, whereby laser light source 32 emits a light beam for recording. The emitted light beam for recording is focused by condenser lens 33 to form fine light spot S in a region of magnetic recording layer 23 of magneto-optical recording medium 21 where the magnetic field is locally applied. In the spot formation, the focusing and tracking are controlled by driving of lens holder 34 by actuator 36 so that light spot S formed by condenser lens 33 follows the displacement of magnetic recording layer 23 in the Z direction and the displacement of the recording track in the Y direction caused by the decentering of the recording medium (perpendicular to the recording track and parallel to the surface of magneto-optical recording medium 21).

Light spot S locally heats magnetic recording layer 23 to lower the coercivity at spot S to form a magnetized region in correspondence with the direction of the applied magnetic field. Thereby, information signals are recorded on the magnetic recording layer by change of the magnetization direction.

As described above, in a conventional magneto-optical recording apparatus, the surface of magneto-optical recording medium 21 deviates positionally from the prescribed level in the Z direction (direction perpendicular to the surface of magneto-optical recording medium 21) owing to irregularity or variation of the thickness, swing and so forth of the face of magneto-optical recording medium 21. The positional deviation is within the range of about ±300 μm. Magnetic pole P of magnetic head 25 and light spot S of the recording light beam of optical head 26 are both displaced following the displacement of magneto-optical recording medium 21 in the Z direction.

In magnetic head 25, slider 30 is held at the tip of first supporter 31 which is tilted at a certain angle relative to magneto-optical recording medium 21. Therefore, with the displacement in the Z direction, magnetic pole P of core 28 is also displaced in the X direction (parallel to the recording track within the plane parallel to the surface of magneto-optical recording medium 21). Similarly, since condenser lens 33 is held at the tip of second supporter 35 in optical head 26, light spot S of the light beam for recording is also displaced in the X direction with its displacement in the Z direction. Accordingly, with the displacement in the Z direction, the relative position of magnetic pole P to light spot S is changed in the X direction.

Since a sufficient intensity of the magnetic field for the recording is applied only in the limited region of magnetic recording layer 23 confronting the end face of magnetic pole P, light spot S should be formed within the region of magnetic field application. Accordingly, the dimension of the magnetic field application region in the X direction should be sufficiently large not to cause deviation of light spot S out of the magnetic field application region even when the relative position of magnetic pole P to light spot S varies.

The shape and size of the magnetic field application region is nearly the same as the shape and size of the end face of magnetic pole P of magnetic head 25. For the larger dimension of the magnetic field application region in the X direction, the dimension of the end face of magnetic pole P in the X direction should be increased. However, the increase of the dimension of the end face of magnetic field P of magnetic head 25 causes a proportional increase of the inductance of magnetic head 25. The larger inductance of magnetic head 25 lowers the upper limit of the modulation frequency of the generated magnetic field, lowering the speed of recording of information signals.

From the above reasons, conventional magneto-optical recording apparatus could not achieve sufficiently high speed of recording of information signals.

SUMMARY OF THE INVENTION

The present invention intends to provide a magneto-optical recording head which realizes less change of the relative position of a magnetic head to an optical head along the recording track direction when the magnetic head and the optical head are displaced the same distance in a direction perpendicular to the surface of a magneto-optical recording medium.

The magneto-optical recording head of the present invention comprises a magneto-optical recording head comprising a magnetic head for applying a magnetic field to a magneto-optical recording medium, an optical head placed with interposition of the recording medium in opposition to the magnetic head for projecting a light spot through a condenser lens onto the region to which the magnetic field is applied, a first supporter for supporting the magnetic head, and a second supporter for supporting the condenser lens; wherein displacement of relative positions of a magnetic field-generating portion of the magnetic head and the light spot in a horizontal direction parallel to a surface of the recording medium caused by displacements of the magnetic field-generating portion of the magnetic head and the light spot in a direction perpendicular to a surface of the recording medium is smaller than a displacement of the magnetic field-generating portion in the horizontal direction parallel to the surface of the recording medium.

The magneto-optical recording apparatus of the present invention employs the above magneto-optical recording head.

DETAILED DESCRIPTION OF THE PREFERRED EMBODIMENTS

The magneto-optical recording head and the magneto-optical recording apparatus of the present invention are explained below.

Figure 1:
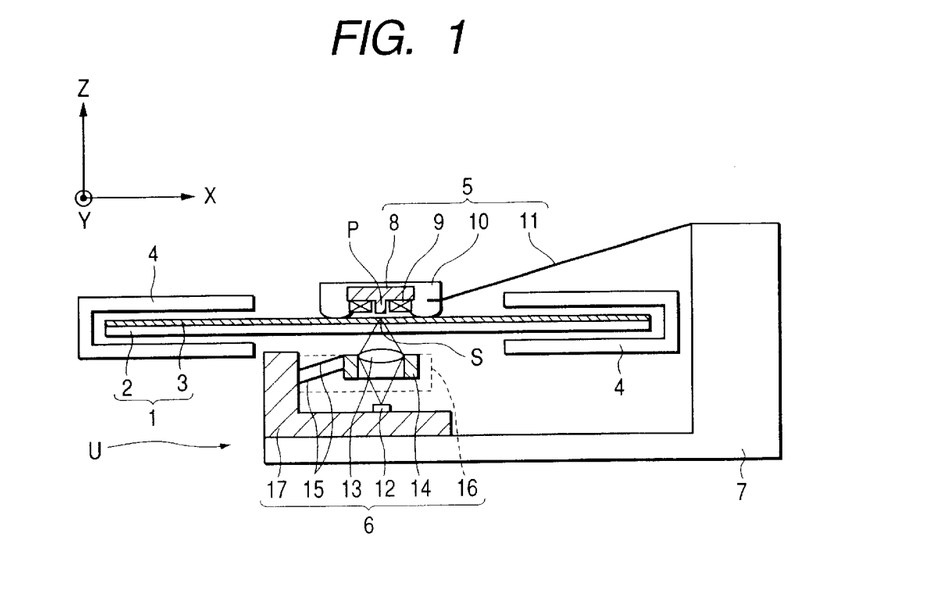
FIG. 1 shows constitution of an example of the magneto-optical recording apparatus of the present invention.
Figure 2:
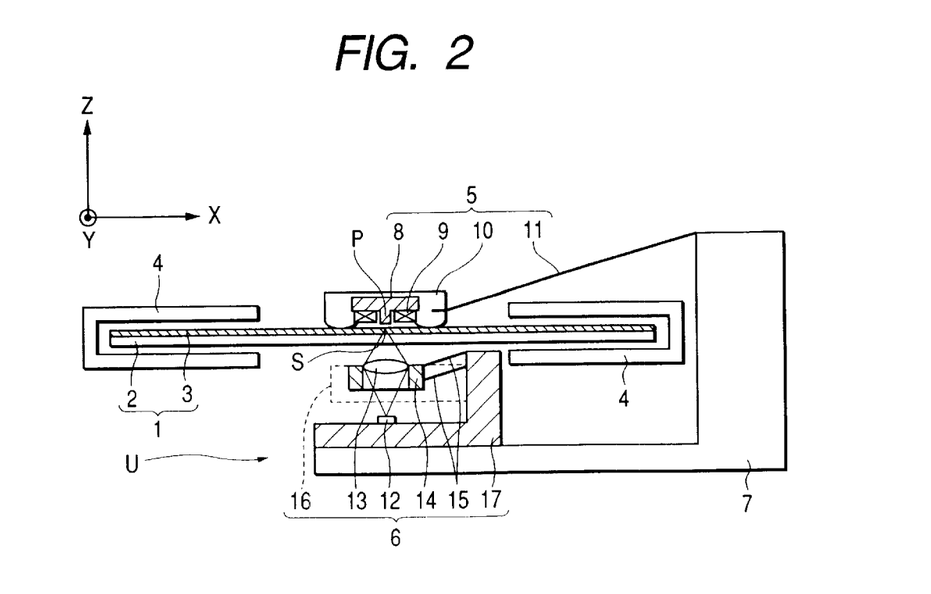
FIG. 2 shows constitution of another example of the magneto-optical recording apparatus of the present invention.

FIG. 1 and FIG. 2 are respectively a side view illustrating construction of an example of the magneto-optical recording apparatus of the present invention. Disk-shaped magneto-optical recording medium 1 is comprised of substrate 2 made of a transparent material such as glass and resins, and a magnetic recording layer 3 formed on the substrate 2. The recording medium is housed in cartridge 4. Magnetic recording layer 3 has a recording track in a spiral shape for recording the information signals. Magneto-optical recording medium 1 is connected to a spindle motor (not shown in the drawing).

Apertures are formed on a part of cartridge 4. Magnetic head 5 is placed at the aperture on the upper face side (on the side of magnetic recording layer 3) of magneto-optical recording medium 1 and optical head 6 is placed at the other aperture on the lower side thereof in opposition to and with interposition of magneto-optical recording medium 1. Magnetic head 5 and optical head 6 are attached to connecting member 7 in integration to constitute magneto-optical recording head U.

Magnetic head 5 comprises core 8 which is comprised of a magnetic material like ferrite and has protruding columnar magnetic pole P as the magnetic field-generating portion, coil 9 surrounding the magnetic pole P, slider 10 comprised of a material like a lubricative resin or ceramic, and first supporter 11 in a flat plate shape comprised of an elastic material like phosphor bronze or a beryllium copper. Core 8 is mounted together with coil 9 on slider 10 such that the end face of magnetic pole P for magnetic field generation opposes magneto-optical recording medium 1. Slider 10 is fixed at the tip end of first supporter 11 and is pressed to the surface of magneto-optical recording medium 1 by the elasticity of first supporter 11.

Optical head 6 comprises laser light source 12 like a semiconductor laser, condenser lens 13, lens holder 14, second supporter 15 in a straight line shape comprised of an elastic material like phosphor bronze or beryllium copper, actuator 16 placed around lens holder 14, and basement 17 for holding these constituting members. Condenser lens 13 is held by lens holder 14, which is fixed to the tip end of second supporter 15. The base end of second supporter 15 is fixed to basement 17 which is fixed to connecting member 7. Actuator 16 is comprised of a coil and a permanent magnet which are not shown in the drawing, and drives lens holder 14 electromagnetically.

On recording the information signals, slider 10 of magnetic head 5 is pressed against the surface of magneto-optical recording medium 1, and on loading or unloading of cartridge 4, slider 10 is withdrawn upward so as not to collide with cartridge 4. Therefore, the base end of first supporter 11 is fixed to connecting member 7 at a position higher than the upper face of cartridge 4. Thus, while slider 10 is pressed against the surface of magneto-optical recording medium 1, first supporter 11 is tilted at a certain angle to magneto-optical recording medium 1.

The angle of first supporter 11 to magneto-optical recording medium 1, and the angle of second supporter 15 to magneto-optical recording medium 1 are suitably selected. This is described later in detail.

Coil 9 of magnetic head 5 is connected to a magnetic head driving circuit (not shown in the drawing), and laser light source 12 of optical head 6 is connected to a laser driving circuit (not shown in the drawing) respectively.

In recordation of information signals on magneto-optical recording medium 1, firstly, magneto-optical recording medium 1 is rotated by the spindle motor. In the rotation, slider 10 of magnetic head 5 is allowed to slide on or above magneto-optical recording medium 1. Since slider 10 is pressed against the surface of magneto-optical recording medium 1, magnetic pole P of core 8 set on slider 10 can follow the displacement in the Z direction (direction perpendicular to the surface of the magneto-optical recording medium) of the surface of the magneto-optical recording medium 1 caused by irregularity or variation in the thickness, or swing of the face of magneto-optical recording medium 1. Thereby, the interspace is kept constant between the end face of magnetic pole P of core 8 and magnetic recording layer 3 of magneto-optical recording medium 1. An electric current is applied from the magnetic head driving circuit to coil 9 of magnetic head 5 to generate a magnetic field modulated by information signals to be recorded at the end face of magnetic pole P of magnetic head 5. This magnetic field is applied virtually perpendicularly to magnetic recording layer 3 of magneto-optical recording medium 1 opposing the end face of magnetic pole P. Simultaneously, electric current is applied from the laser driving circuit to laser light source 12 of optical head 6, whereby laser light source 12 emits a light beam for recording. The emitted light beam for recording is focused by condenser lens 13 to form fine light spot S in a region of magnetic recording layer 3 of magneto-optical recording medium 1 where the magnetic field is locally applied. In the spot formation, the focusing and tracking are controlled by driving of lens holder 14 by actuator 16 so that light spot S formed by condenser lens 13 follows the displacement of magnetic recording layer 3 in the Z direction and the displacement in the Y direction (virtually perpendicular to the recording track and parallel to the surface of magneto-optical recording medium 1).

Light spot S locally heats magnetic recording layer 3 to lower the coercivity at light spot S, whereby a magnetized region in correspondence with the direction of applied magnetic field is formed. As a result, information signals are recorded on the magnetic recording layer 3 as he magnetization directions change.

Figure 3:
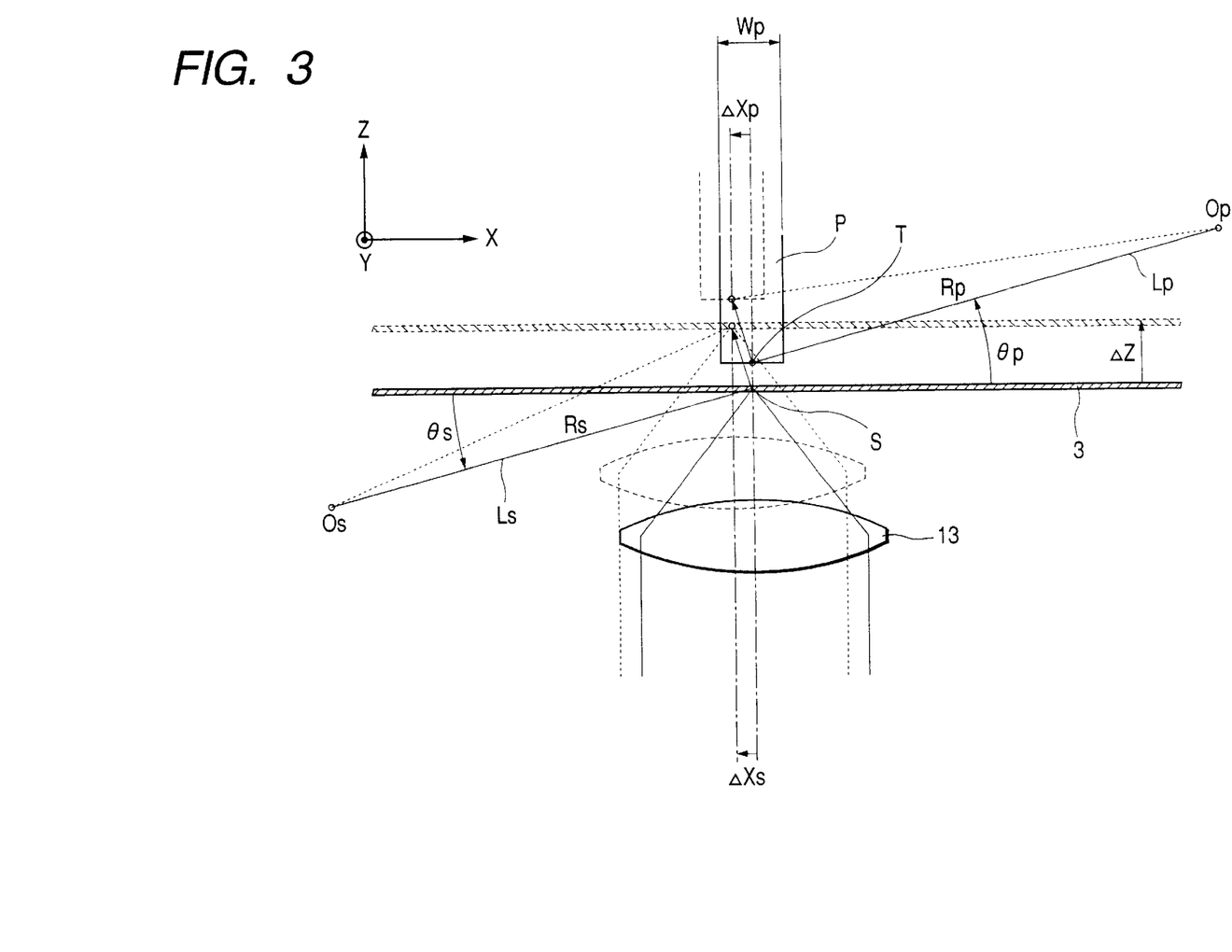
FIG. 3 is an enlarged view of the magnetic pole P, the light spot S, and the surrounding parts thereof of the magneto-optical recording apparatus of the present invention.

Next, the explanation is made below on the displacement movement of magnetic pole P of magnetic head 5 and light spot S formed by optical head 6. FIG. 3 is an enlarged view of magnetic pole P, light spot S, and surrounding parts thereof. As described above, magnetic recording layer 3 formed on the surface of substrate 2 of magneto-optical recording medium 1 will deviate from the prescribed position in the Z direction owing to irregularity or variation in the thickness of magneto-optical recording medium 1, or swing of the face thereof. The positional deviation is within the range of about ±300 $\mu$m. Magnetic pole P of magnetic head 5 and light spot S of recording light beam of optical head 6 are both displaced following the displacement of the magneto-optical recording layer medium in the Z direction. In FIG. 3, the solid lines indicate the members including magnetic recording layer 3, magnetic pole P, condenser lens 13, and so forth at the prescribed position in the Z direction, and the dotted lines indicate the same members at a displaced position.

The sufficient intensity of the magnetic field for the recording is applied only in the limited region of magnetic recording medium 3 confronting the end face of magnetic pole P. Therefore, light spot S should be formed within this magnetic field application region. For this purpose, the positions of magnetic head 5 and optical head 6 are adjusted preliminarily in the assemblage of the apparatus so that center T of the end face of magnetic pole P and the position of light spot S coincide in the X direction. However, with displacement of magnetic recording medium 3 in the Z direction, magnetic pole P will be turned to cause displacement along a circle line around a center point, since magnetic head 5 has slider 10 held at the tip end of first supporter 11. This center point of the turning is named as first turning center Op. Therefore, center T of the end face of magnetic pole P is displaced by $\Delta Z$ from the prescribed position in the Z direction, and simultaneously is displaced by $\Delta Xp$ in the X direction (direction parallel to magneto-optical recording medium 1 and approximately parallel to the recording track). Similarly, light spot S of the recording light beam will be turned to cause displacement along a circle line around a center point, since optical head 6 has condenser lens 13 held at the tip end of second supporter 15. This center point of the turning is named as second turning center Os. Therefore, light spot S is displaced by $\Delta Z$ from the prescribed position in the Z direction, and simultaneously is displaced by $\Delta Xs$ in the X direction. The displacement of both of magnetic pole P and light spot S in the X direction causes change of the relative positions therebetween. To meet the variation of the relative position, width Wp of the end face of magnetic pole P of magnetic head 5 in the X direction should at least be larger than the sum of the maximum difference in the relative position between magnetic pole P and light spot S and the possible error (e.g., 40 $\mu$m) such as positional deviation in assemblage of magnetic head 5 and optical head 6.

In the description below, for the maximum displacement in the negative Z direction of magnetic pole P and light spot S from prescribed positions, $\Delta Xp^-$ indicates displacement of magnetic pole P from the prescribed position in the X direction; $\Delta Xs^-$ indicates displacement of light spot S from the prescribed position in the X direction; and $\Delta Xp-s^-$ indicates the change of relative position of magnetic pole P to light spot S in the X direction. Then, $|\Delta Xp-s^-|$ is smaller than $|\Delta Xp^-|$. Similarly, for the maximum displacement in the positive Z direction of magnetic pole P and light spot S from prescribed positions, $\Delta Xp^+$ indicates displacement of magnetic pole P from the prescribed position in the X direction; $\Delta Xs^+$ indicates displacement of light spot S from the prescribed position in the X direction; and $\Delta Xp-s^+$ indicates the change of relative position between magnetic pole P and light spot S in the X direction. Then, $|\Delta Xp-s^+|$ is smaller than $|\Delta Xp^+|$. Preferably, the head is constructed such that the displacement $\Delta Xp^-$ or $\Delta Xp^+$ of magnetic pole P from the prescribed position in the X direction and the displacement $\Delta Xs^-$ or $\Delta Xs^+$ of light spot S from the prescribed position in the X direction are nearly the same in the directions and the extents of the displacement. Thereby, the change of the relative position between magnetic pole P and light spot S caused by the displacement of the magnetic recording layer in the Z direction can be decreased, which enables decrease of the width Wp of the end face of magnetic pole P in the X direction. Such a constitution is described below more specifically.

The straight line passing through first turning center Op and center T of the end face of magnetic pole P is defined as first straight line Lp. The tilting angle of first line Lp to the surface of magneto-optical recording medium 1 is represented by θp. The straight line passing through second turning center Os and light spot S is defined as second straight line Ls. The tilting angle of second line Ls to the surface of magneto-optical recording medium 1 is represented by θs. Assuming that turning radius Rp of magnetic pole P and turning radius Rs of light spot S are much larger than the displacement in the Z direction, displacement ΔXp of magnetic pole P from the prescribed position in the X direction accompanied by displacement in the Z direction is approximately equal to ΔZ·tan(θp), and displacement ΔXs of light spot S from the prescribed position in the X direction accompanied by displacement in the Z direction is approximately equal to ΔZ·tan(θs). Accordingly, to make ΔXp and ΔXs equal, θp and θs are made equal to each other.

Preferably, the relative position of magnetic pole P to light spot S in the Y direction (direction nearly perpendicular to the recording track in the plane parallel to the surface of magneto-optical recording medium 1) is not changed even with the displacement in the Z direction, and the displacement in the horizontal direction caused by the displacement in the Z direction does not affect the tracking control of light spot S. For this purpose, first straight line Lp and second straight line Ls should be nearly on the same plane which defines the XZ plane to allow both the displacement of magnetic pole P and the displacement of light spot S in the X direction (direction nearly parallel to the recording track in the plane parallel to the surface of magneto-optical recording medium 1).

Table 1 shows examples of the present invention in which displacements ΔXp⁻ and ΔXp⁺ of magnetic pole P, and those of ΔXs⁻ and ΔXs⁺ of light spot S in the X direction for the maximum displacement in the Z direction thereof are calculated for the set tilting angles θp of first straight line Lp and θs of second straight line Ls to magneto-optical recording medium 1. Table 1 also shows the calculated values of comparative examples. In all of the examples and the comparative examples, the maximum displacement in the Z direction is ±300 μm, turning radius Rp of magnetic pole P is 25 mm, and turning radius Rs of light spot S is 7 mm.

In Table 1, ΔXp-s⁻ signifies (ΔXp⁻)-(ΔXs⁻) namely the change of relative position of magnetic pole P to light spot S in the X direction at the maximum displacement in the negative Z direction thereof. ΔXp-s⁺ signifies (ΔXp⁺)-(ΔXs⁺), namely the change of relative position of magnetic pole P to light spot S in the X direction at the maximum displacement in the positive Z direction thereof. |ΔXp-s| signifies the change of relative position of magnetic pole P to light spot S for ΔZ of from −300 μm to +300 μm, and is the largest of the values |ΔXp-s⁻|, |ΔXp-s⁺|, and |(ΔXp-s⁻)-(ΔXp-s⁺)|. Width in the X direction Wp of the end face of magnetic pole P of magnetic head 5 should be larger than the sum of the change of the relative position |ΔXp-s| of magnetic pole P to light spot S and the errors caused by positional deviation in assemblage of magnetic head 5 with optical head 6 (e.g., 40 μm).

Incidentally in FIG. 3, the sign for the direction of the displacement is positive (+) for the right side in the X direction, and positive (+) for upside in the Z direction. The inclination angles θp and θs are measured counterclockwise from the surface (0°) of magneto-optical recording medium as the reference face.

In Table 1, in Examples 1–3 and Comparative Examples 1 and 2, the tilt angle θp is set at 5°. With this tilt angle of θp=5° and with tilt angle θs set at 0°, as in Comparative Example 1, ΔXs⁻ and ΔXs⁺ are both in the negative X direction. That is, the displacement direction of light spot S in the X direction is unchanged irrespective of the positive or negative displacement in the Z direction. On the other hand, in the same Comparative Example, ΔXp⁻ and ΔXp⁺ are in opposite displacement directions (+ and −). That is, the displacement direction in the X direction of magnetic pole P depends on the displacement direction in the Z direction. In such a case, with the displacement in the negative Z direction (−direction), magnetic pole P and light spot S are displaced in opposite directions to each other, resulting in relative positional displacement |ΔXp-s⁻| larger than displacement of magnetic pole P, |ΔXp⁻|, undesirably. In this Comparative Example, width Wp of the end face of magnetic pole P in the X direction shoud be not less than 92.5 μm.

As shown by Comparative Example 2, with θs set at 10° (=2·θp), the displacement ΔXs⁻ and ΔXs⁺ of light spot S in the X direction is approximately twice that of ΔXp⁻ and ΔXp⁺ respectively, resulting in relative positional displacements of magnetic pole P to light spot S, |ΔXp-s⁻| and |ΔXp-s⁺|, being equal to or larger than the displacement |ΔXp⁻| and |ΔXp⁺| of magnetic pole P, undesirably. in this Comparative Example, width Wp of the end face of magnetic pole P in the X direction should be not less than 90.4 μm.

On the other hand, with θs set at 2.5° (=0.5·θp) as in Example 2, or θs set at 7.5° (=1.5·θp) as in Example 3, the changes of the relative position of magnetic pole P to light spot S, |ΔXp-s⁻| and |ΔXp-s⁺|, are sufficiently smaller than the displacement of magnetic pole P, |ΔXp⁻| and |ΔXp⁺|, advantageously. Width Wp of the end face of magnetic pole P in the X direction should be not less than 66.3 μm in Example 2, and not less than 66.6 μm in Example 3.

With θs set at 5° (=θp) as in Example 1, the displacement ΔXp⁻ or ΔXp⁺ of magnetic pole P in the X direction, and the displacement ΔXs⁻ or ΔXs⁺ of light spot S in the X direction are nearly the same in direction and extent, resulting in the minimum values of |ΔXp-s⁻| and |ΔXp-s⁺|, which is the most effective. In this Example, width Wp of the end face of magnetic pole P in the X direction should be not less than 44.7 μm.

In Examples 4–6 and Comparative Examples 3 and 4, tilt angle θp is set at 10°. In these cases, the results are similar to those of Examples 1–3 and Comparative Examples 1 and 2. In Comparative Example 3 with θs set at 0°, the change of relative position of magnetic pole P to light spot S, |ΔXp-s⁻|, is larger than displacement of magnetic pole P, |ΔXp⁻|. This is not effective, and width Wp of the end face of magnetic pole P should be not less than 145.8 μm. In Comparative Example 4 with θs set at 20° (=2·θp), the change of relative position of magnetic pole P to light spot S, |ΔXp-s⁻| and |ΔXp-s⁺|, is not less than displacement of magnetic pole P, |ΔXp⁻| and |ΔXp⁺|. This is not effective, and width Wp of the end face of magnetic pole P should be not less than 152.8 μm.

On the other hand, in Example 5 with θs set at 50° (=0.5·θp), and in Example 6 with θs set at 15° (=1.5°θp), the changes of the relative position of magnetic pole P to light spot S, $|\Delta xp-s^-|$ and $|\Delta Xp-s^+|$, are sufficiently smaller than the displacement of magnetic pole P, $|\Delta xp^-|$ and $|\Delta Xp^+|$, advantageously. Width Wp of the end face of magnetic pole P in the X direction should be not less than 93.3 μm in Example 5, and not less than 95.1 μm in Example 6.

in other words are placed virtually parallel to each other, which is most effective. Incidentally, the supporting directions of first supporter 11 and second supporter 15 may be opposite as shown in FIG. 1 or in the same direction as shown in FIG. 2.

TABLE 1

| | Displacement in X Direction Caused by Displacement in Z Direction of Magnetic Pole P and Optical Spot S (Unit: μm) | | | | | | | |
|---|---|---|---|---|---|---|---|---|
| | φp | φs | ΔXp⁻ | ΔXs⁻ | ΔXp-s⁻ | ΔXp⁺ | ΔXs⁺ | ΔXp-s⁺ | \|ΔXp-s\| |

| | φp | φs | ΔXp⁻ | ΔXs⁻ | ΔXp-s⁻ | ΔXp⁺ | ΔXs⁺ | ΔXp-s⁺ | \|ΔXp-s\| |
|---|---|---|---|---|---|---|---|---|---|
| Example | | | | | | | | | |
| 1 | 5° | 5° | 24.4 | 19.8 | 4.7 | −28.1 | −32.8 | 4.7 | 4.7 |
| 2 | 5° | 2.5° | 24.4 | 6.7 | 17.8 | −28.1 | −19.6 | −8.5 | 26.3 |
| 3 | 5° | 7.5° | 24.4 | 32.9 | −8.5 | −28.1 | −46.1 | 18.1 | 26.6 |
| 4 | 10° | 10° | 51.0 | 46.2 | 4.8 | −54.8 | −56.7 | 1.9 | 4.8 |
| 5 | 10° | 5° | 51.0 | 19.8 | 31.3 | −54.8 | −32.8 | −22.0 | 53.3 |
| 6 | 10° | 15° | 51.0 | 73.3 | −22.3 | −54.8 | −87.6 | 32.8 | 55.1 |
| Comparative Example | | | | | | | | | |
| 1 | 5° | 0° | 24.4 | −6.4 | 30.9 | −28.1 | −6.4 | −21.6 | 52.5 |
| 2 | 5° | 10° | 24.4 | 46.2 | −21.8 | −28.1 | −56.7 | 28.6 | 50.4 |
| 3 | 10° | 0° | 51.0 | −6.4 | 57.5 | −54.8 | −6.4 | −48.4 | 105.8 |
| 4 | 10° | 20° | 51.0 | 101.6 | −50.6 | −54.8 | −117.1 | 62.3 | 112.8 |

In Example 4 with θs set at 10° (=θp), the displacement $\Delta Xp^-$ or $\Delta Xp^+$ of magnetic pole P in the X direction, and the displacement $\Delta Xs^-$ or $\Delta Xs^+$ of light spot S in the X direction are nearly the same in direction and extent, resulting in the minimum values of $|\Delta Xp-s^-|$ and $|\Delta Xp-s^+|$. In this Example, width Wp of the end face of magnetic pole P in the X direction should be not less than 44.8 μm.

From the above results, the change $|\Delta Xp-s^-|$ of the relative position of magnetic pole P to light spot S can be made smaller than the displacement $|\Delta Xp^-|$ of magnetic pole P from a prescribed position, and the change $|\Delta Xp-s^+|$ of the relative position of magnetic pole P to light spot S can be made smaller than the displacement $|\Delta Xp^+|$ of magnetic pole P from a prescribed position. This is done by setting the tilt angle θp of the first straight line Lp passing through the first turning center θp and the center T of the end face of magnetic pole P relative to the surface of magneto-optical recording medium 1 and the tilt angle θs of the second straight line Ls passing through the second turning center Os and the light spot S relative to the surface of magneto-optical recording medium 1 in the range of 0<θs2·θp, or more preferably 0.5·θp≦θs≦1.5·θp, or still more preferably θs=θp.

Tilt angle θp depends on the shape of first supporter 11 for supporting the slider 10 of magnetic head and the angle of supporter 11 to magneto-optical recording medium 1. Tilt angle θs depends on the shape of second supporter 15 for supporting condenser lens 13 of optical head 6 and the angle of second supporter 15 to magneto-optical recording medium 1. Therefore, θp and θs can be set so as to satisfy the aforementioned relations by selecting the shape of first supporter 11 and the angle thereof to magneto-optical recording medium 1; and the shape of second supporter 15 and the angle thereof to magneto-optical recording medium 1. For example, if both first supporter 11 and second supporter 15 are in the shape of a plane or a straight line, the angle of first supporter 11 to magneto-optical recording medium 1 and the angle of second supporter 15 to magneto-optical recording medium 1 are made equal to each other, or

What is claimed is:

1. A magneto-optical recording head comprising:
   a magnetic head for applying a magnetic field to a magneto-optical recording medium;
   an optical head placed with interposition of the recording medium in opposition to said magnetic head for projecting a light spot through a condenser lens onto the region to which the magnetic field is applied;
   a first supporter for supporting said magnetic head; and
   a second supporter for supporting the condenser lens, wherein
   relative displacement of a magnetic field-generating portion of said magnetic head and the light spot in a horizontal direction parallel to a surface of the recording medium caused by displacements of the magnetic field-generating portion and the light spot in a direction perpendicular to a surface of the recording medium is smaller than a displacement of the magnetic field-generating portion of said magnetic head in the horizontal direction parallel to the surface of the recording medium.

2. The magneto-optical recording head according to claim 1, wherein the displacement of the magnetic field-generating portion in the horizontal direction parallel to the surface of the recording medium and a displacement of the light spot in the horizontal direction parallel to the surface of the recording medium caused by displacements of the magnetic field-generating portion of said magnetic head and the light spot in a direction perpendicular to a surface of the recording medium are nearly the same.

3. The magento-optical recording head, according to claim 1, wherein the horizontal direction parallel to the surface of the recording medium is a direction nearly parallel to a recording track formed on the recording medium.

4. The magneto-optical recording head according to claim 1, wherein said first supporter supports said magnetic head so as to be turnable around a first turning center, and said second supporter supports said condenser lens so as to be turnable around a second turning center, a first straight line passing through the first turning center and the center of magnetic field-generating portion and a second straight line passing through the second turning center and the light spot are nearly on the same plane, the tilt angle θp of the first straight line to the surface of the magneto-optical recording medium and the tilt angel θs of the second straight line to the surface of the magneto-optical recording medium satisfy the relation:

$$0<\theta s<2\cdot\theta p.$$

5. The magneto-optical recording head according to claim 4, wherein θp and θs satisfy the reltaion:

$$0.5\cdot\theta p \leq \theta s \leq 1.5\cdot\theta p.$$

6. The magneto-optical recording head according to claim 1, wherein said first supporter and said second supporter form a single carriage to mount said magnetic head and said optical head.

7. A magneto-optical recording apparatus, comprising:
   a magneto-optical recording head comprising:
      a magnetic head for applying a magnetic field to a magneto-optical recording medium;
      an optical head placed with interposition of the recording medium in opposition to said magnetic head for projecting a light spot through a condenser lens onto the region to which the magnetic field is applied;
      a first supporter for supporting said magnetic head; and
      a second supporter for supporting the condenser lens, wherein
      relative displacement of a magnetic field-generating portion of said magnetic head and the light spot in a horizontal direction parallel to a surface of the recording medium caused by displacements of the magnetic field-generating portion and the light spot in a direction perpendicular to a surface of the recording medium is smaller than a displacement of the magnetic field-generating portion of said magnetic head in the horizontal direction parallel to the surface of the recording medium; and
   a cartridge to house the recording medium.

8. A magneto-optical recording apparatus according to claim 7, wherein the displacement of the magnetic field-generating portion in the horizontal direction parallel to the surface of the recording medium and a displacement of the light spot in the horizontal direction parallel to the surface of the recording medium caused by displacements of the magnetic field-generating portion of said magnetic head and the light spot in a direction perpendicular to a surface of the recording medium are nearly the same.

9. A magneto-optical recording apparatus according to claim 7, wherein the horizontal direction parallel to the surface of the recording medium is a direction nearly parallel to a recording track formed on the recording medium.

10. A magneto-optical recording apparatus according to claim 7, wherein said first supporter supports said magnetic head so as to be turnable around a first turning center, and said second supporter supports said condenser lens so as to be turnable around a second turning center, a first straight line passing through the first turning center and the center of magnetic field-generating portion and a second straight line passing through the second turning center and the light spot are nearly on the same plane, the tilt angle θp of the first straight line to the surface of the magneto-optical recording medium and the tilt angle θs of the second straight line to the surface of the magneto-optical recording medium satisfy the relation:

$$0<\theta s<2\cdot\theta p.$$

11. A magneto-optical recording apparatus according to claim 10, wherein θp and θs satisfy the relation:

$$0.5\cdot\theta p \leq \theta s \leq 1.5\cdot\theta p.$$

12. A magneto-optical recording apparatus according to claim 7, wherein said first supporter and said second supporter form a single carriage to mount said magnetic head and said optical head.

* * * * *

UNITED STATES PATENT AND TRADEMARK OFFICE
CERTIFICATE OF CORRECTION

PATENT NO.      : 6,466,523 B1
DATED           : October 15, 2002
INVENTOR(S)     : Kazuyoshi Ishii It is certified that error appears in the above-identified patent and that said Letters Patent is hereby corrected as shown below:

Column 5,
Line 56, "he" should read -- the --.

Column 6,
Line 15, "magn etic" should read -- magnetic --.

Column 8,
Line 30, "in" should read -- In --.

Column 9,
Line 2, "|Δxp⁻" should read -- |ΔXp⁻| --.
Line 32, "|Δxp-s⁻" should read -- |ΔXp-s⁻| --.
Line 43, "θp" should read -- Op --.

Column 10,
Table 1, "φp" should read -- θp --; and "φs" should read -- θp --.

Signed and Sealed this

Sixth Day of May, 2003

JAMES E. ROGAN
*Director of the United States Patent and Trademark Office*